June 23, 1970  R. W. ASTHEIMER  3,517,190
METHOD OF REMOTELY MONITORING STACK EFFLUENT
Filed Dec. 1, 1967  2 Sheets-Sheet 1
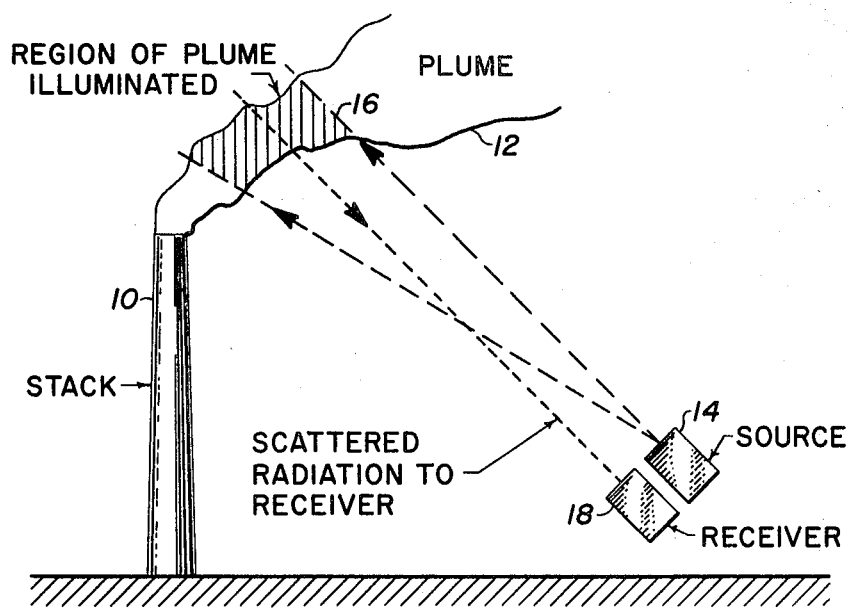
Fig_1
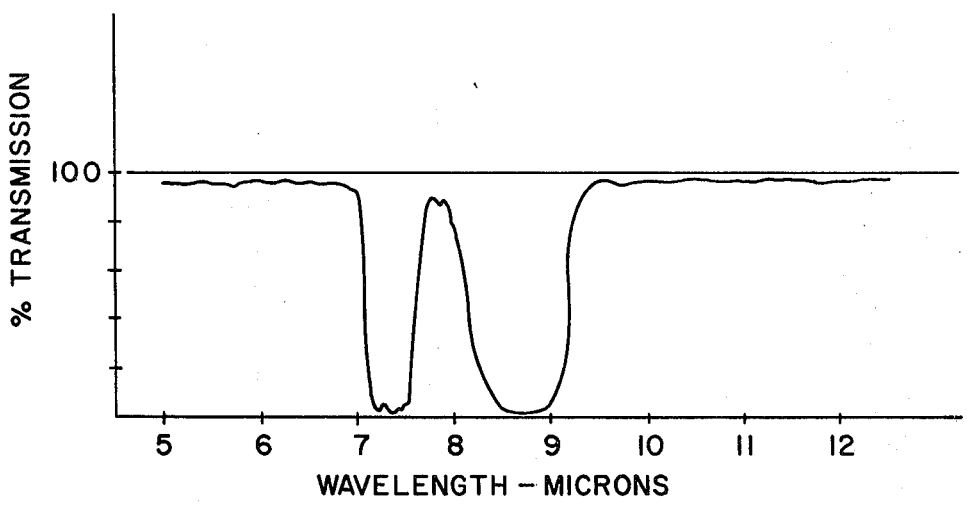
Fig_2
INVENTOR.
ROBERT W. ASTHEIMER
BY

United States Patent Office 3,517,190
Patented June 23, 1970

3,517,190
METHOD OF REMOTELY MONITORING STACK EFFLUENT
Robert W. Astheimer, Westport, Conn., assignor to Barnes Engineering Company, Stamford, Conn., a corporation of Delaware
Filed Dec. 1, 1967, Ser. No. 687,376
Int. Cl. G01n 21/26
U.S. Cl. 250—43.5                2 Claims

ABSTRACT OF THE DISCLOSURE

A smoke plume is illuminated near the top of the stack with a chopped source emitting radiation over a broad spectral region. A remotely positioned receiver, in proximity to or near the source, views the illuminated region of the plume in two spectral regions, one in an absorption band, and the other on either side of the absorption band. The receiver develops signals from the scattered radiation in the two spectral regions, and the ratio of these signals is utilized to measure the quantity of the absorbing gas in the illuminated cross section of the plume.

BACKGROUND OF THE INVENTION

The composition of the smoke stack or chimney exhaust gas is a good measure of the efficiency of the combustion process. With the increasing importance of the control of air pollution, monitoring stack effluent forms a necessary, if not essential role in combating air pollution. The difficulty with standard flue gas analysis techniques arises from the fact that they all either operate within the stack or require the taking of samples of the exhaust gases from the stack. These techniques are satisfactory for internal plant use, but are not practical for air pollution control by a municipality or other control agency. For such an application an optical or infrared technique to observe the stack exhaust from a remote location would be ideal, since it would permit checking the stack effluent at any time without access to the installation.

One well known optical technique would be to cause the gas being analyzed to flow between a source of radiation and a receiver, and to measure the degree of absorption occurring at wavelengths corresponding to the characteristic absorption bands of the composite gases. This method is not generally suited for a remote analysis because it requires the source of radiation and the receiver to be on opposite sides of the plume and to be on a straight line passing through the plume. Accordingly, an optical method which permits the radiation source and the receiver to be located in close proximity on the ground would be highly desirable. Of course, it is also desirable and advantageous that the system be capable of operating at any time, night or day.

Accordingly, it is an object of this invention to provide an optical method for analyzing stack effluent which is relatively simple, easy to operate, which overcomes some of the difficulties enumerated in providing a remote monitoring system for stack effluent.

SUMMARY OF THE INVENTION

In carrying out this invention in one illustrative embodiment thereof, the method of this invention utilizes scattered radiation from the stack plume as a virtual source for a receiver. A source of chopped radiation covering a spectral region which includes at least two wavelengths illuminates a section of the stack plume near the top of the stack. A receiver positioned on the same side of the stack as the source views the illuminated region of the plume in at least two spectral regions, one of which is an absorption band, and the other on either side of the absorption band. Signals from these two bands are ratioed to measure the quantity of absorbing gas in the cross section of the plume illuminated. In situations where measurements are affected by clouds in the background, the source and the receiver may be separated sufficiently so that the line of sight of the receiver and the source intersect only at the stack plume.

BRIEF DESCRIPTION OF THE DRAWINGS

FIG. 1 is a diagram illustrating the optical method for analyzing stack effluent in accordance with this invention, FIG. 2 is a graph of Transmission vs. Wavelength showing the absorption bands of sulphur dioxide.

DESCRIPTION OF THE PREFERRED EMBODIMENTS

Figure 3:
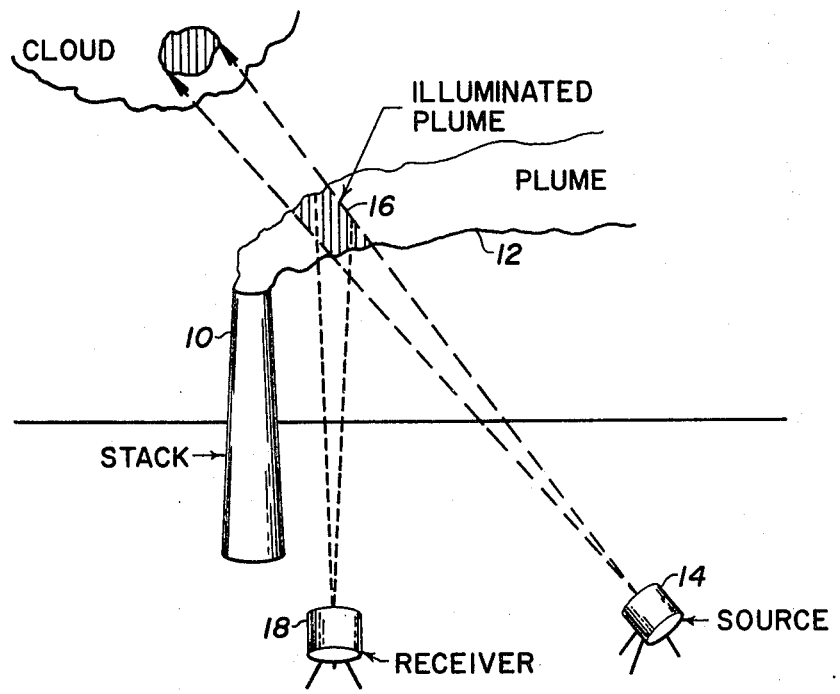
FIG. 3 is an illustration of the method of this invention as applied when clouds appear in the background.

One of the basic concepts of the present method for analyzing stack effluent is to use scattered radiation from the plume of a stack as a virtual source for a receiver. This arrangement is shown in FIG. 1. A stack or chimney 10 emits exhaust gas in the form of a plume 12. A telescope with a chopped radiation source 14 is provided which emits radiation over a broad spectral region in the infrared. It is desirable to utilize a source which provides radiation in a broad spectral region to provide latitude in analyzing a broad range of exhaust gases. However, in its most restricted sense, it is required that the source of radiation which is emitted by the source 14 cover at least two spectral regions. A chopped high-temperature source, or an arc lamp such as that used in a refraction meter, may be utilized for the source 14. However, the type of source utilized is not restricted to these types, and may include others, e.g., a tunable laser or two lasers could be used. The source 14 is pointed to illuminate a section 16 of the plume 12 near the top of the stack 10. A receiver 18 which is attached to or in close proximity to the source 14 views the illuminated region 16 of the plume 12 in two spectral regions, one in an absorption band and the other on either side of the absorption band. The receiver 18 develops signals for the two spectral regions from the scattered radiation from the section 16 of the plume 12. It will subsequently be shown that the ratio of these two signals is a measure of the quantity of absorbing gas in the cross section 16 of the plume 12. A filter wheel radiometer is preferred as the receiver 18 for making the measurements in the two spectral regions, using either a continuously variable filter, or a set of fixed filters selected for specific absorbers.

An example of the use of this technique would be the detection of sulphur dioxide which is frequently a troublesome stack exhaust product. The absorption characteristics of $SO_2$ are shown in FIG. 2. It will be seen to have a strong absorption band between 8 and 9 microns and to have no absorption between 10 and 11 microns. Therefore for the detection of this constituent the ratio of the scattered radiation in the 8–9$\mu$ and 10–11$\mu$ spectral regions would be used.

The accuracy of the present method is based on the following conditions being satisfied:

(1) The scattering and absorbing agents are both uniformly distributed throughout the plume section.

(2) The scattering coefficient over the spectral interval considered is constant or its variation is predictable, although the absolute value need not be known.

(3) The stack plume is optically thin, i.e., the radiation scattered is small compared to the incident radiation.

Generally, the first condition is a reasonable assumption. Regarding the second, in the infrared spectral region the scattering particles will generally be small with respect to the wavelength, producing Rayleigh scattering, where the scattering coefficient decreases as a fourth power of the wavelength, which is predictable. Alternately, reference wavelengths could be used on both sides of the absorption band to obtain a better measure of the scatter in the absorption band itself.

Although the plume should not scatter too strongly (condition 3), there must be sufficient radiation scattered back to give a detectable signal. If this is not the case, then the plume is sufficiently free of exhaust products which cause scattering, and it is not likely that pollution is being generated from the stack. A problem which might arise would be from false signals generated from radiation scattered by clouds in the background. This problem can be avoided by separating the source 14 and the receiver 18 as shown in FIG. 3 so that the receiver line of sight and the source beam intersect at the plume only. In this arrangement the common zone of the intersection would be the only possible source of chopped illuminator radiation within the field of view of the receiver 18.

Figure 4:
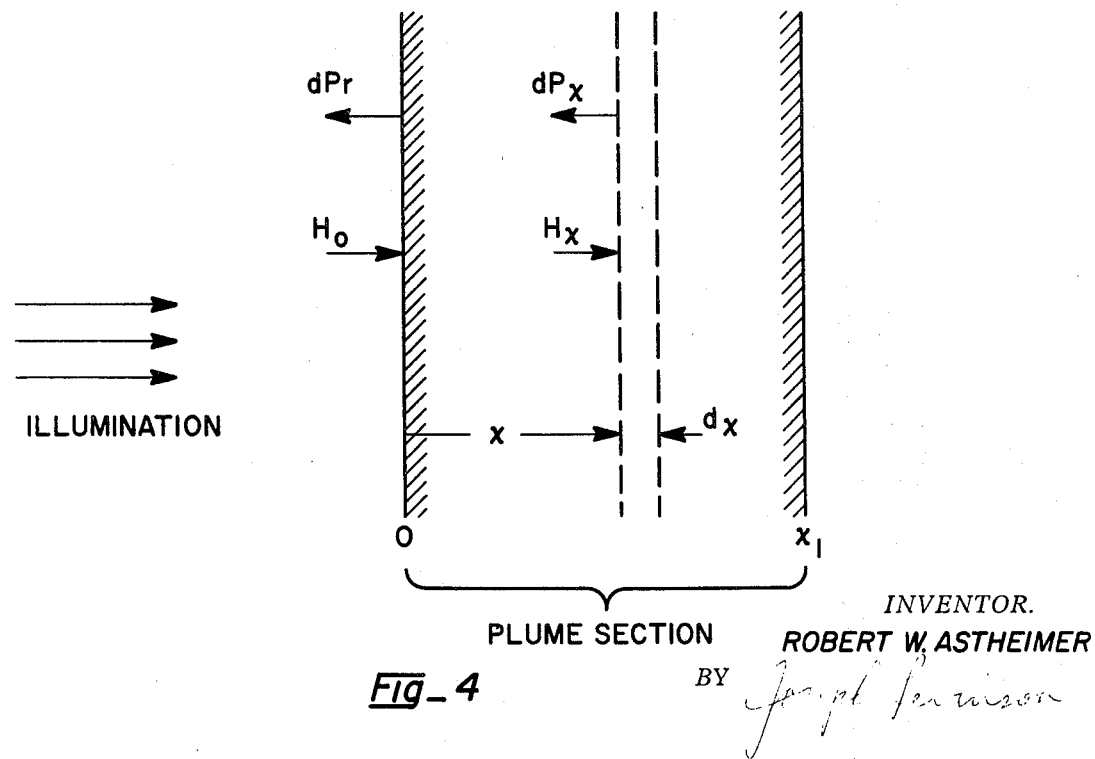
FIG. 4 shows an idealized section of a plume which is useful for explanatory purposes.

Reference is now made to FIG. 4 for a mathematical analysis of the present method. Consider an idealized section of plume as shown in FIG. 4. The irradiance on the plume from the illuminator is designated $H_o$ (watts/cm.$^2$). The irradiance on a slab $dx$ thick, within the plume a distance $x$, is $H_x$. $H_x$ will be less than $H_o$ because of scattering and absorption over the path $x$.

Let $\delta$ = scattering coefficient (m.$^{-1}$)
$a$ = absorption coefficient (m.$^{-1}$)
Then
$$H_x = H_o \epsilon^{-(a+\delta)x}$$

We now define $dP_x$ as the power scattered back by the thin slab $dx$. Thus:
$$dP_x = \delta H_x dx = \delta H_o \epsilon^{-(a+\delta)x} dx$$

This radiation is again reduced on the return trip by scattering and absorption and the amount emerging from the slab is $dP_r$.
$$dP_r = \delta H_o \epsilon^{-2(a+\delta)x} dx$$

The total amount of radiation scattered back from the plume ($P_r$) is the integral of $dP_r$ over the thickness of the plume from $x=o$ to $x=x_1$. Integrating and substituting limits we obtain:
$$P_r = \frac{H_o \delta}{2(a+\delta)} [1 - \epsilon^{-2(a+\delta)x_1}]$$

The radiation scattered will only be a small fraction of that incident (condition 3); therefore we can substitute for the exponential, the first three terms of the series expansion:
$$\epsilon^x = 1 + x + \frac{x^2}{2} + \cdots$$

Employing this approximation:
$$P_r = \frac{H_o \delta}{2(a+\delta)} [1 - 1 + 2(a+\delta)x_1 - 2(a+\delta)^2 x_1^2]$$

Which when simplified becomes:
$$P_r = H_o \delta x_1 [1 - (a+\delta)x_1]$$

Now let the scattered radiation in an adjacent spectral region where there is no absorption ($\alpha = 0$) $P_r'$. We will assume $\delta$ and $H_o$ to be the same, which would be the case if an average were taken for wavelengths on either side of the absorption band.

Then:
$$P_r' = H_o \delta x_1 [1 - \delta x_1]$$

We now compute the difference between these two signals relative to the reference band (without absorption) defining this ratio as R.
$$R = \frac{P_r' - P_r}{P_r'} = 1 - \frac{P_r}{P_r'} = \frac{ax_1}{1 - \delta x_1}$$

Again since the scattering is a small fraction of the total, we can neglect $\delta x_1$ as compared to unity and we have:
$$R = ax_1$$

The product $ax_1$ is a direct measure of the total quantity of absorber in a tube of unit area cross section passing through the plume. The significance of the result is that this quantity is given directly by the simple ratio of the backscattered signal in two spectral regions, and is completely independent of the scattering coefficient. The latter fact is most important since the scattering may be highly variable and unknown.

A method has thus been provided for utilizing an infrared technique for analyzing stack effluent. This method permits an optical arrangement whereby the source and the receiver may be located at ground level on the same side of the plume, either in the same place, or separated, depending on atmospheric conditions, which allows the remote monitoring for the control of air pollution. The method is simple, yet performs a function which could not otherwise be done on a spot basis, either day or night.

I claim:
1. The method of remotely monitoring stack effluent comprising the steps of
   (a) illuminating a section of the stack plume near the top of the stack with a chopped source of radiation covering at least two spectral regions, one in an absorption region of a gas to be analyzed and one in a non-absorbing region of the gas to be analyzed,
   (b) positioning a receiver on the same side of the stack plume as the source to view the illuminated region of the plume in at least the two aforesaid spectral regions,
   (c) detecting signals in said receiver in the aforesaid two spectral regions, and
   (d) taking the ratio of the signals in the aforesaid two spectral regions for measuring the quantity of absorbing gas in the stack plume.
2. The method set forth in claim 1 including the step of separating the source and the receiver so that the line of sight of the receiver and the source intersect only at the stack plume.

References Cited

UNITED STATES PATENTS

| | | |
|---|---|---|
| 2,237,193 | 4/1941 | Mosby. |
| 3,317,730 | 5/1967 | Hilsum _____ 250—43.5 X |
| 3,364,351 | 1/1968 | Palmer et al. _____ 250—43.5 |
| 3,443,095 | 5/1969 | Früngel. |

ARCHIE R. BORCHELT, Primary Examiner

U.S. Cl. X.R.

250—83.3; 356—104, 207